United States Patent
Kato et al.

(10) Patent No.: US 9,937,752 B2
(45) Date of Patent: Apr. 10, 2018

(54) RUBBER COMPOSITION FOR COATING FIBER CORD, AND PNEUMATIC TIRE

(71) Applicant: THE YOKOHAMA RUBBER CO., LTD., Minato-ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/311,481

(22) PCT Filed: Dec. 19, 2014

(86) PCT No.: PCT/JP2014/083762
§ 371 (c)(1),
(2) Date: Nov. 15, 2016

(87) PCT Pub. No.: WO2015/173992
PCT Pub. Date: Nov. 19, 2015

(65) Prior Publication Data
US 2017/0080754 A1    Mar. 23, 2017

(30) Foreign Application Priority Data

May 16, 2014 (JP) ................. 2014-102240

(51) Int. Cl.
| | |
|---|---|
| *B60C 1/00* | (2006.01) |
| *C08C 19/22* | (2006.01) |
| *C08K 3/04* | (2006.01) |
| *C08K 3/32* | (2006.01) |
| *C08L 7/00* | (2006.01) |
| *C08L 9/00* | (2006.01) |
| *C08L 15/00* | (2006.01) |
| *C09D 107/00* | (2006.01) |
| *D07B 1/06* | (2006.01) |
| *C08K 5/16* | (2006.01) |
| *C08L 9/06* | (2006.01) |
| *C08L 91/00* | (2006.01) |

(52) U.S. Cl.
CPC ............. *B60C 1/0041* (2013.01); *B60C 1/00* (2013.01); *C08C 19/22* (2013.01); *C08K 3/04* (2013.01); *C08K 3/32* (2013.01); *C08K 5/16* (2013.01); *C08L 7/00* (2013.01); *C08L 9/00* (2013.01); *C08L 9/06* (2013.01); *C08L 15/00* (2013.01); *C08L 91/00* (2013.01); *C09D 107/00* (2013.01); *D07B 1/06* (2013.01)

(58) Field of Classification Search
CPC ......... B60C 1/0041; B60C 1/00; C08C 19/22; C08K 3/04; C08K 3/32; C08L 7/00; C08L 9/00; C08L 15/00; C09D 107/00; D07B 1/06
USPC ......................................... 152/564
See application file for complete search history.

(56) References Cited

U.S. PATENT DOCUMENTS 3,792,031 A * 2/1974 Udding .................. C08C 19/22
                                                                525/333.1
2013/0207043 A1    8/2013 Menozzi et al.

FOREIGN PATENT DOCUMENTS

| JP | 2008127464 A | | 6/2008 |
|---|---|---|---|
| JP | 2010241898 A | | 10/2010 |
| JP | 2011016924 A | * | 1/2011 |
| JP | 2013159717 A | | 8/2013 |
| JP | 2013543516 A | | 12/2013 |

OTHER PUBLICATIONS

JP2011-016924A—machine translation.*

* cited by examiner

*Primary Examiner* — Ling Choi
*Assistant Examiner* — Ronald Grinsted
(74) *Attorney, Agent, or Firm* — Carrier Blackman & Associates, P.C.; Joseph P. Carrier; Anne G. Sabourin

(57) ABSTRACT

A rubber composition for coating a fiber cord includes a diene rubber, a carbon black, and a nitrone compound having a carboxy group; the diene rubber includes a natural rubber and a styrene-butadiene rubber and/or a butadiene rubber, wherein a content of the natural rubber in a total of the diene rubber and the nitrone compound is not greater than 65 mass %; a content of the carbon black is 40 to 67 parts by mass per 100 parts by mass of a total of the diene rubber and the nitrone compound; and a content of the nitrone compound is 0.1 to 10 parts by mass per 100 parts by mass of a total of the diene rubber and the nitrone compound. Such rubber composition for coating a fiber cord has excellent low heat build-up when a tire is produced and excellent adhesiveness with carcass cord.

10 Claims, 1 Drawing Sheet

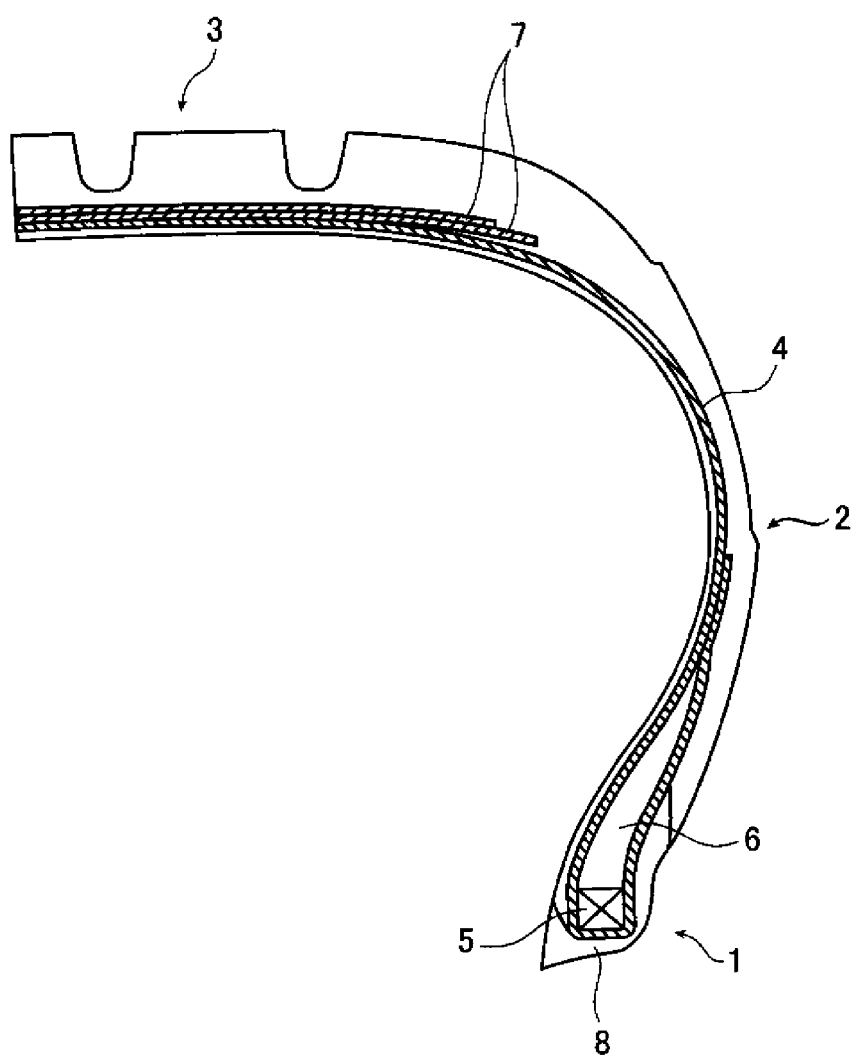

RUBBER COMPOSITION FOR COATING FIBER CORD, AND PNEUMATIC TIRE

TECHNICAL FIELD

The present invention relates to a rubber composition for coating a fiber cord and a pneumatic tire.

BACKGROUND ART

It is known that a rubber composition that coats a tire cord used in a tire, particularly a carcass cord that forms the framework for a tire, requires superior fracture characteristics and adhesiveness with the carcass cord.

Such a rubber composition is known. For example, Patent Document 1 describes "a rubber composition for tires comprising (a) not less than 50 parts by mass of a natural rubber; (b) from 20 to 50 parts by mass of a styrene-butadiene copolymer rubber; (c) from 0 to 20 parts by mass of a butadiene rubber (the total of the component (a), component (b), and component (c) being 100 parts by mass); (d) from 30 to 70 parts by mass of a carbon black having a nitrogen adsorption specific surface area of 20 to 100 $m^2/g$; (e) the amount (specified below) of sulfur; and (f) from 0.5 to 4.0 parts by mass of dithiodicaprolactam; the mass ratio (e)/(f) of component (e) and component (f) being from 0.2 to 0.8" (claims 1 to 3).

CITATION LIST

Patent Literature

Patent Document 1: Japanese Unexamined Patent Application Publication No. 2011-016924A

SUMMARY OF INVENTION

Technical Problem

When the present inventors prepared the rubber composition described in Patent Document 1 and produced a tire, the low heat build-up of the obtained tire did not necessarily satisfy the level demanded today, and furthermore, it was evident that there was room for improvement in adhesiveness with the carcass cord.

Thus, an object of the present invention is to provide a rubber composition for coating a fiber cord having excellent low heat build-up when included in a formed tire and excellent adhesiveness with carcass cord, and a pneumatic tire that uses the rubber composition.

Solution to Problem

The present inventors have conducted diligent research on the above-described problems, and discovered that the above-described problem can be solved by blending a nitrone compound having a carboxy group in a rubber composition or by modifying a certain conjugated diene polymer in the rubber composition with the above-described nitrone compound, and completed the present invention.

Specifically, the inventors discovered that the object described above can be achieved by the following features.

[1] A rubber composition for coating a fiber cord including a diene rubber, a carbon black, and a nitrone compound having a carboxy group;
the diene rubber including a natural rubber and a styrene-butadiene rubber and/or a butadiene rubber;
a content of the natural rubber in a total of the diene rubber and the nitrone compound being not greater than 65 mass %;
a content of the carbon black being from 40 to 67 parts by mass per 100 parts by mass of a total of the diene rubber and the nitrone compound; and
a content of the nitrone compound being from 0.1 to 10 parts by mass per 100 parts by mass of a total of the diene rubber and the nitrone compound.

[2] The rubber composition for coating a fiber cord according to [1], wherein a content of the styrene-butadiene rubber and the butadiene rubber is from 10 to 60 mass % in a total of the diene rubber and the nitrone compound.

[3] A rubber composition for coating a fiber cord including a diene rubber and a carbon black;
the diene rubber including a natural rubber and a modified rubber, the modified rubber being obtained by reacting a nitrone compound having a carboxy group with a double bond of a styrene-butadiene rubber and/or a butadiene rubber;
a content of the natural rubber in the diene rubber being not greater than 65 mass %;
a content of the carbon black being from 40 to 67 parts by mass per 100 parts by mass of the diene rubber; and
a content of the nitrone compound used for synthesis of the modified rubber being from 0.1 to 10 parts by mass per 100 parts by mass of the diene rubber.

[4] The rubber composition for coating a fiber cord according to [3], wherein a content of the styrene-butadiene rubber and the butadiene rubber used for synthesizing the modified rubber is from 10 to 60 mass % in the diene rubber.

[5] The rubber composition for coating a fiber cord according to any one of [1] to [4], wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

[6] The rubber composition for coating a fiber cord according to any one of [1] to [5], wherein a nitrogen adsorption specific surface area of the carbon black is from 20 to 60 $m^2/g$.

[7] A pneumatic tire including a carcass cord coated using the rubber composition for coating a fiber cord described in any one of [1] to [6].

Advantageous Effects of Invention

As described below, according to the present invention, a rubber composition for coating a fiber cord having excellent low heat build-up when a tire is produced and excellent adhesiveness with carcass cord, and a pneumatic tire that includes the rubber composition can be provided.

BRIEF DESCRIPTION OF DRAWINGS

FIG. 1 is a partial cross-sectional schematic view of a tire that represents one embodiment of a pneumatic tire of the present invention.

DESCRIPTION OF EMBODIMENTS

Hereinafter, the rubber composition for coating a fiber cord of the present invention and the pneumatic tire of the present invention will be described.

Note that, in the present specification, numerical ranges indicated using "(from) . . . to . . . " include the former number as the lower limit value and the later number as the upper limit value.

Rubber Composition for Coating a Fiber Cord

In a first aspect, a rubber composition for coating a fiber cord of the present invention (also referred to as "rubber composition of the present invention" hereinafter) includes a diene rubber, a carbon black, and a nitrone compound having a carboxy group (also referred to as "carboxynitrone" hereinafter).

Here, the diene rubber comprises a natural rubber and a styrene-butadiene rubber and/or a butadiene rubber, and the content of the natural rubber is not greater than 65 mass % in the total of the diene rubber and the nitrone compound. The content of the styrene-butadiene rubber and the butadiene rubber in the total of the diene rubber and the nitrone compound is preferably from 10 to 60 mass %.

The content of the carbon black is preferably from 40 to 67 parts by mass per 100 parts by mass of total of the diene rubber and the nitrone compound.

The content of the nitrone compound is preferably from 0.1 to 10 parts by mass per 100 parts by mass of the total of the diene rubber and the nitrone compound.

Similarly, a second aspect of the rubber composition of the present invention contains a diene rubber and a carbon black.

Here, the diene rubber comprises a natural rubber and a modified rubber, the modified rubber (also called "carboxynitrone-modified rubber" hereinafter) being obtained by reacting a nitrone compound having a carboxy group with a double bond of a styrene-butadiene rubber and/or a butadiene rubber, and the content of the natural rubber in the diene rubber is not greater than 65 mass %. The content of the styrene-butadiene rubber and butadiene rubber used for the synthesis of the modified rubber is preferably from 10 to 60 mass % relative to the diene rubber.

The content of the carbon black is from 40 to 67 parts by mass per 100 parts by mass of the diene rubber.

The content of the nitrone compound used for synthesis of the modified rubber is from 0.1 to 10 parts by mass per 100 parts by mass of the diene rubber.

In this manner, the second aspect of the rubber composition of the present invention corresponds to an aspect in which the styrene-butadiene rubber and/or butadiene rubber in the diene rubber are modified by carboxynitrone instead of carboxynitrone being blended in the first aspect of the rubber composition of the present invention described above.

Because the rubber compositions (the first and second aspects) of the present invention have the above-described constitution, they are thought to have excellent low heat build-up when a tire is produced and excellent adhesiveness with carcass cord. Although the reason is not clear, it is assumed to be as follows.

The rubber composition of the present invention includes carboxynitrone or carboxynitrone-modified rubber, as described above.

Here, it is thought that the carboxy group originating in the carboxynitrone (or the carboxynitrone after modification) has affinity with the fiber cords and exhibits excellent adhesiveness.

Additionally, dispersibility of the carbon black improves because the carboxy group interacts with the carbon black in the composition. As a result, it is conceived that Payne effect is reduced, and excellent low heat build-up is exhibited.

That is, the first and second aspects are thought to exhibit desired effects via the same mechanism.

The rubber compositions of the first and second aspects of the present invention are each described in detail below.

First Aspect

As described above, in the first aspect, the rubber composition of the present invention (also simply referred to as the "first aspect" hereinafter) includes a diene rubber, a carbon black, and a nitrone compound (carboxynitrone). The diene rubber includes a natural rubber and a styrene-butadiene rubber and/or a butadiene rubber.

Each component included in the first aspect will be described in detail hereinafter.

Diene Rubber

The diene rubber included in the first aspect contains a natural rubber and a styrene-butadiene rubber and/or a butadiene rubber.

The diene rubber may include a rubber component besides a natural rubber, a styrene-butadiene rubber, and a butadiene rubber.

Such a rubber component is not particularly limited, but examples include isoprene rubber (IR), acrylonitrile-butadiene copolymer rubber (NBR), butyl rubber (IIR), halogenated butyl rubber (Br-IIR, Cl-IIR), chloroprene rubber (CR), and the like.

Natural Rubber

The natural rubber included in the diene rubber is not particularly limited.

The content of the natural rubber in the total of the diene rubber described above and the carboxynitrone described below is not particularly limited as long as it is not greater than 65 mass %, but from the perspectives of improved weatherability and better adhesiveness, it is preferably from 40 to 65 mass % and more preferably from 45 to 60 mass %.

Note that the "content of the natural rubber in the total of the diene rubber and the carboxynitrone" refers to a content (mass %) of the natural rubber based on the total of the diene rubber and the carboxynitrone being 100 mass %. For example, if the composition contains 50 parts by mass of the natural rubber, diene rubber consisting of 34 parts by mass of the styrene-butadiene rubber and 15 parts by mass of the butadiene rubber, and 1 part by mass of carboxynitrone, the content of the natural rubber in the total of the diene rubber and the carboxynitrone is 50 mass % (=50/(50+34+15+1)× 100).

Styrene-Butadiene Rubber

The styrene-butadiene rubber included in the diene rubber is not particularly limited.

The styrene monomer used to obtain a styrene-butadiene rubber is not particularly limited, but examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, dimethylaminomethylstyrene, dimethylaminoethylstyrene, and the like. Among these, styrene, α-methylstyrene, and 4-methylstyrene are preferred, and styrene is more preferred. Such a styrene monomer may be used alone, or a combination of two or more types may be used.

Examples of a butadiene monomer used for the production of the styrene-butadiene rubber is not particularly limited, but include 1,3-butadiene, isoprene(2-methyl-1,3-butadiene), 2,3-dimethyl-1,3-butadiene, 2-chloro-1,3-butadiene, and the like. Among these, 1,3-butadiene or isoprene is preferred, and 1,3-butadiene is more preferred. Such a butadiene monomer may be used alone, or a combination of two or more types may be used.

The content of styrene units in the styrene-butadiene rubber is not particularly limited, but preferably not less than 10 mass %. Of these, the content of styrene units is more preferably from 15 to 30 mass %. Note that a content of styrene units in a styrene-butadiene rubber refers to a proportion (mass %) of styrene monomer units in a styrene-butadiene rubber.

From the viewpoint of ease of handling, a weight average molecular weight (Mw) of styrene-butadiene rubber described above is preferably from 100,000 to 1,500,000 and more preferably from 300,000 to 1,300,000. In the present specification, the weight average molecular weight (Mw) is measured by gel permeation chromatography (GPC) based on calibration with polystyrene standards using tetrahydrofuran as a solvent.

Butadiene Rubber

The butadiene rubber contained in the diene rubber instead of the above-described styrene-butadiene rubber or together with the above-described styrene-butadiene rubber is not particularly limited.

Products that may be used as the above-described butadiene rubber include commercially available butadiene rubbers polymerized using, for example, Ziegler catalysts such as titanium tetrahalide-trialkylaluminum-based, diethylaluminum chloride-cobalt-based, trialkylaluminum-boron trifluoride-nickel-based, and diethylaluminum chloride-nickel-based catalysts; lanthanoid rare earth alkali metal catalysts such as triethylaluminum-organic acid neodymium-Lewis acid-based catalysts; and organic alkali metal compounds similar to those used in solution polymerized styrene-butadiene rubber.

Furthermore, some of the above-described butadiene rubber may have a branched structure or a polar functional group by using a polyfunctional modifying agent such as tin tetrachloride, silicon tetrachloride, or an alkoxysilane containing an epoxy group in the molecule, or an alkoxysilane containing an amine group.

From the viewpoint of ease of handling, a weight average molecular weight (Mw) of the butadiene rubber is preferably from 100000 to 1500000 and more preferably from 300000 to 1300000, similar to the above-described styrene-butadiene rubber.

The content of the styrene-butadiene rubber and butadiene rubber in the total of the diene rubber described above and the carboxynitrone described below is preferably from 10 to 60 mass %, more preferably from 35 to 60 mass %, and even more preferably from 40 to 55 mass %.

Note that the "content of styrene-butadiene rubber and butadiene rubber" means the total content when both of these rubbers are included, and means the content of either one when only one of these rubbers is included.

Carbon Black

The carbon black included in the first aspect is not particularly limited and, for example, carbon blacks with various grades, such as SAF-HS, SAF, ISAF-HS, ISAF, ISAF-LS, IISAF-HS, HAF-HS, HAF, HAF-LS, FEF, GPF or SRF can be used.

The nitrogen adsorption specific surface area ($N_2SA$) of the carbon black is not particularly limited, but is preferably from 20 to 60 $m^2/g$, and more preferably from 30 to 50 $m^2/g$.

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

In the first aspect, the content of carbon black is from 40 to 67 parts by mass, and preferably from 45 to 65 parts by mass, per 100 parts by mass of the total of the diene rubber described above and the carboxynitrone described below.

Nitrone Compound Having a Carboxy Group

As described above, a nitrone compound having a carboxy group (carboxynitrone) is included in the first aspect.

The carboxynitrone is not particularly limited as long as it is a nitrone that has at least one carboxy group (—COOH). The nitrone herein refers to a compound having a nitrone group represented by Formula 1 below.

[Chemical Formula 1]

Formula (1)

In Formula 1, * indicates a bond position.

The carboxynitrone is preferably a compound represented by Formula b below.

[Chemical Formula 2]

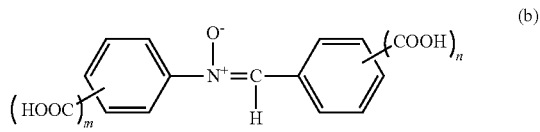

(b)

In Formula b, m and n each independently represent an integer from 0 to 5, and the sum of m and n is 1 or greater.

The integer represented by m is preferably an integer from 0 to 2, and more preferably an integer of 0 or 1, because solubility to a solvent during carboxynitrone synthesis will be better and thus synthesis will be easier.

The integer represented by n is preferably an integer from 0 to 2, and more preferably an integer of 0 or 1, because solubility to a solvent during carboxynitrone synthesis will be better and thus synthesis will be easier.

Furthermore, the sum of m and n (m+n) is preferably from 1 to 4, and more preferably 1 or 2.

The compound is not particularly limited to a carboxynitrone such as that represented by Formula b but is preferably a compound selected from the group consisting of N-phenyl-α-(4-carboxyphenyl)nitrone represented by Formula (b1) below, N-phenyl-α-(3-carboxyphenyl)nitrone represented by Formula (b2) below, N-phenyl-α-(2-carboxyphenyl)nitrone represented by Formula (b3) below, N-(4-carboxyphenyl)-α-phenylnitrone represented by Formula (b4) below, N-(3-carboxyphenyl)-α-phenylnitrone represented by Formula (b5) below, and N-(2-carboxyphenyl)-α-phenylnitrone represented by Formula (b6) below.

[Chemical Formula 3]

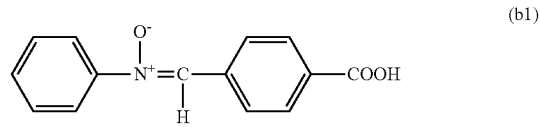

(b1)

-continued

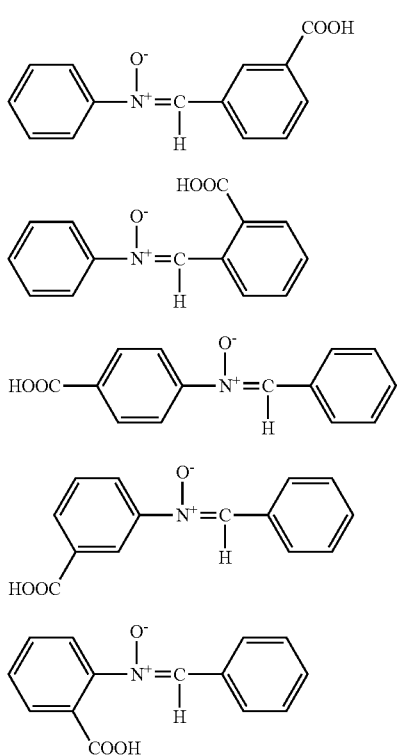

The method of synthesizing the carboxynitrone is not particularly limited, and conventionally known methods can be used. For example, a compound (carboxynitrone) having a carboxy group and a nitrone group can be obtained by stirring a compound having a hydroxyamino group (—NHOH) and a compound having an aldehyde group (—CHO) and a carboxy group at a molar ratio of hydroxyamino group to aldehyde group (—NHOH/—CHO) of from 1.0 to 1.5 in the presence of an organic solvent (for example methanol, ethanol, tetrahydrofuran, and the like) at room temperature for from 1 to 24 hours to allow the both groups to react.

In the first aspect, the content of carboxynitrone is from 0.1 to 10 parts by mass per 100 parts by mass of total of the diene rubber and the carboxynitrone. If the content of the carboxynitrone is out of the range described above, low heat build-up or adhesiveness becomes insufficient.

The content of carboxynitrone is preferably from 0.5 to 4 parts by mass per 100 parts by mass of the total of the diene rubber and the carboxynitrone.

Second Aspect

As described above, the second aspect of the rubber composition of the present invention (also simply referred to as the "second aspect" hereinafter) includes a diene rubber and a carbon black.

The diene rubber includes a natural rubber and a modified styrene-butadiene rubber (carboxynitrone-modified rubber) that can be obtained by a reaction of a nitrone compound having a carboxy group with a double bond of a styrene-butadiene rubber and/or a butadiene rubber.

Furthermore, specific examples and suitable embodiments of the carbon black included in the second aspect are the same as those of the carbon black included in the first aspect described above.

Diene Rubber

As described above, the diene rubber included in the second aspect includes a natural rubber and a modified rubber (carboxynitrone-modified rubber) that can be obtained by a reaction of a nitrone compound having a carboxy group with a double bond of a styrene-butadiene rubber and/or a butadiene rubber.

The diene rubber may include a rubber component besides a natural rubber and a carboxynitrone-modified rubber. Such a rubber component is not particularly limited, but examples include isoprene rubber (IR), styrene-butadiene rubber (SBR), butadiene rubber (BR), acrylonitrile-butadiene copolymer rubber (NBR), butyl rubber (IIR), halogenated butyl rubber (Br-IIR, Cl-IIR), chloroprene rubber (CR), and the like.

Natural Rubber

The natural rubber included in the diene rubber is not particularly limited.

The content of the natural rubber in the above-described diene rubber is not particularly limited as long as it is not greater than 65 mass %, but from the perspectives of improved weatherability and better adhesiveness, it is preferably from 40 to 65 mass %, and more preferably from 45 to 60 mass %.

Modified Rubber

As described above, the above-described diene rubber includes a modified rubber (carboxynitrone-modified rubber) that can be obtained by a reaction of a nitrone compound having a carboxy group with a double bond of a styrene-butadiene rubber and/or a butadiene rubber.

Specific examples and suitable embodiments of a styrene-butadiene rubber used for synthesis of carboxynitrone-modified rubber are the same as the styrene-butadiene rubbers included in the first aspect described above.

Also, definitions, specific examples and suitable embodiments of the nitrone compound (carboxynitrone) used for synthesis of carboxynitrone-modified rubber are the same as the carboxynitrones included in the first aspect described above.

The method for producing the modified rubber (carboxynitrone-modified rubber) via a reaction of a carboxynitrone with a double bond of a styrene-butadiene rubber and/or a butadiene rubber is not particularly limited, and examples include a method in which the styrene-butadiene rubber and/or butadiene rubber and the carboxynitrone are mixed together for from 1 to 30 minutes at from 100 to 200° C.

When blended as such, a cycloaddition reaction occurs between the double bond of the butadiene included in the styrene-butadiene rubber and/or butadiene rubber and the nitrone group in the carboxynitrone, forming a five-membered ring as illustrated in Formula (4-1) and Formula (4-2) below. Note that Formula (4-1) below represents a reaction between a 1,4 bond and a nitrone group, and Formula (4-2) below represents a reaction between a 1,2-vinyl bond and a nitrone group. Formula (4-1) and Formula (4-2) illustrate the reactions for the case where the butadiene is 1,3-butadiene, but the same reaction leads to a formation of a five-membered ring even in the case where the butadiene is other than 1,3-butadiene.

[Chemical Formula 4]

Formula (4-1)

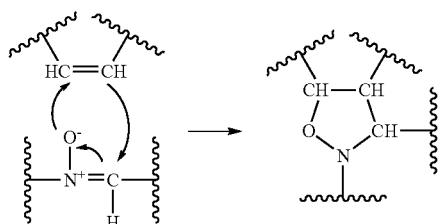

[Chemical Formula 5]

Formula (4-2)

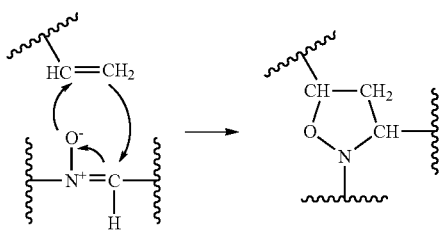

The content of the nitrone compound (carboxynitrone) (also referred to as "converted CPN amount" hereinafter) that is used for synthesis of the above-described modified rubber (carboxynitrone-modified rubber) per 100 parts by mass of the diene rubber is from 0.1 to 10 parts by mass. In particular, it is preferably from 0.5 to 4 parts by mass. If the converted CPN amount is out of the range of from 0.1 to 10 parts by mass, low heat build-up or adhesiveness becomes insufficient.

For example, if 30 parts by mass of the carboxynitrone-modified rubber is included in 100 parts by mass of diene rubber and the above-described carboxynitrone-modified rubber is obtained via a reaction between 100 parts by mass of styrene-butadiene rubber and 1 part by mass of carboxynitrone, 0.30 parts by mass (=30×(1/101)) of carboxynitrone is used for synthesis of 30 parts by mass of carboxynitrone-modified rubber. Thus the converted CPN amount is 0.30 parts by mass.

For synthesis of the carboxynitrone-modified rubber, the amount of carboxynitrone is not particularly limited, but it is preferably from 0.1 to 20 parts by mass and more preferably from 1 to 5 parts by mass per 100 parts by mass of styrene-butadiene rubber or butadiene rubber.

The degree of modification of the carboxynitrone-modified rubber is not particularly limited, but is preferably from 0.02 to 4.0 mol % and more preferably from 0.10 to 2.0 mol %.

Here, "degree of modification" refers to the proportion (mol %) of the double bonds modified by the carboxynitrone relative to all double bonds attributed to butadiene contained in the above-described styrene-butadiene rubber or the above-described butadiene rubber. For example, if the butadiene is 1,3-butadiene, "degree of modification" refers to the proportion (mol %) of the structure represented by Formula (4-1) above or Formula (4-2) above formed by modification by carboxynitrone. The degree of modification can be determined by, for example, performing NMR measurements of the styrene-butadiene rubber or butadiene rubber before and after modification.

Note that a carboxynitrone-modified rubber with a degree of modification of 100 mol % is also classified as a diene rubber in the present specification.

The content of the carboxynitrone-modified rubber is not particularly limited, but is preferably from 10 to 60 mass % and more preferably from 10 to 40 mass %.

The content of the styrene-butadiene rubber and butadiene rubber used for the synthesis of the above-described modified rubber is preferably from 10 to 60 mass %, more preferably from 35 to 60 mass %, and even more preferably from 40 to 55 mass %, relative to the above-described diene rubber.

Note that the "content of styrene-butadiene rubber and butadiene rubber" means the total content when both of these rubbers are included, and means the content of either one when only one of these rubbers is included.

For example, if the diene rubber includes 50 parts by mass of the natural rubber and 35 parts by mass of the unmodified styrene-butadiene rubber and 15 parts by mass of the carboxynitrone-modified rubber, and the carboxynitrone-modified rubber is obtained via the reaction between 100 parts by mass of styrene-butadiene rubber and 1 part by mass of carboxynitrone, 14.85 parts by mass (=15×(100/101)) of styrene-butadiene rubber is used for synthesis of 15 parts by mass of carboxynitrone-modified rubber. Thus, the content of the styrene-butadiene rubber used for the synthesis of the modified rubber relative to the diene rubber is 14.85 parts by mass.

Optional Components

The rubber composition of the present invention may further contain additives as necessary within a scope that does not inhibit the effect or purpose thereof.

Examples of the additives include various additives that are typically used in rubber compositions for tires, such as silica, silane coupling agents, zinc oxide (flower of zinc), stearic acid, adhesive resin, peptizing agent, antiaging agents, wax, processing aids, process oils, liquid polymers, terpene resins, thermosetting resins, tackifier resins, vulcanizing agents, sulfur, and vulcanization accelerators.

Method for Producing Rubber Composition for Coating a Fiber Cord

The method for producing the rubber composition of the present invention is not particularly limited, and specific examples thereof include a method whereby each of the above-described components is kneaded using a publicly known method and device (e.g. Banbury mixer, kneader, roller, and the like). When the rubber composition of the present invention contains sulfur or a vulcanization accelerator, the components other than the sulfur and the vulcanization accelerator are preferably blended first at a high temperature (preferably from 60° C. to 120° C.), then cooled, before blending the sulfur and the vulcanization accelerator.

In addition, the rubber composition of the present invention can be vulcanized or crosslinked under conventional, publicly known vulcanizing or crosslinking conditions.

Application

The rubber composition of the present invention is advantageously used as a rubber composition for coating the fiber cords (especially carcass cords) of a pneumatic tire.

Pneumatic Tire

The pneumatic tire of the present invention is a tire having fiber cords (especially carcass cords) coated using the composition of the present invention described above.

FIG. 1 is a partial cross-sectional schematic view of a tire that represents one embodiment of the pneumatic tire of the present invention, but the pneumatic tire of the present invention is not limited to the aspect illustrated in FIG. 1.

In FIG. 1, reference sign 1 indicates a bead portion, reference sign 2 indicates a sidewall portion, and reference sign 3 indicates a tire tread portion.

In addition, a carcass cord 4, in which fiber cords are embedded, is mounted between a left-right pair of the bead portions 1, and ends of the carcass cord 4 are turned up around bead cores 5 and bead fillers 6 from an inner side to an outer side of the tire.

In the tire tread 3, a belt layer 7 is provided along the entire periphery of the tire on the outer side of the carcass cord 4.

Furthermore, in the bead portion 1, a rim cushion 8 is disposed on a portion contacting the rim.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present invention will be further described in detail with reference to examples; however, the present invention is not limited thereto.

Synthesis of Carboxynitrone

In a 2 L eggplant-shaped flask, methanol heated to 40° C. (900 mL) was placed, and then terephthalaldehydic acid represented by Formula (b-1) below (30.0 g) was added and dissolved. In this solution, a solution in which phenylhydroxylamine represented by Formula (a-1) below (21.8 g) was dissolved in methanol (100 mL) was added and stirred at room temperature for 19 hours. After the completion of stirring, a nitrone compound having a carboxy group (carboxynitrone) (41.7 g) represented by formula (c-1) below was obtained by recrystallization from methanol. The yield was 86%.

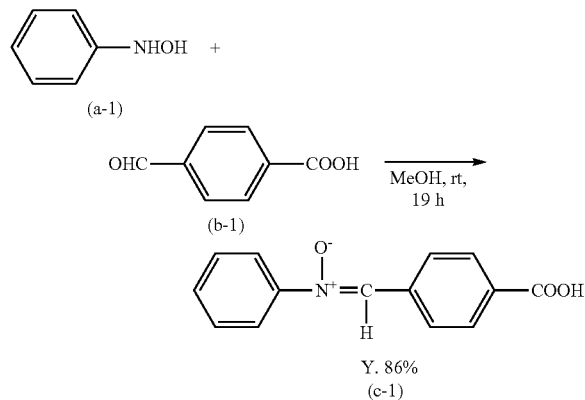

[Chemical Formula 6]

Synthesis of Diphenylnitrone

In a 300 mL eggplant-shaped flask, benzaldehyde represented by formula (6) below (42.45 g) and ethanol (10 mL) were placed, and then a solution in which phenylhydroxylamine represented by formula (5) below (43.65 g) was dissolved in ethanol (70 mL) was added and stirred at room temperature for 22 hours. After the completion of stirring, a nitrone compound without a carboxy group (diphenylnitrone) (65.40 g) represented by formula (7) below was obtained as white crystal by recrystallization from ethanol. The yield was 83%.

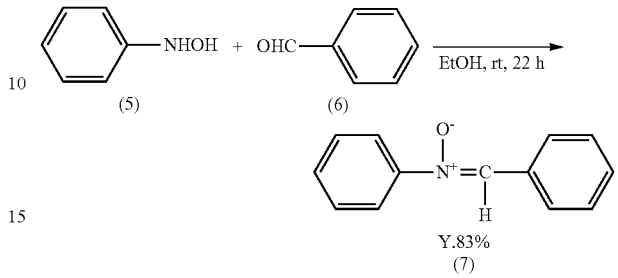

[Chemical Formula 7]

Synthesis of Carboxynitrone-Modified SBR (Modified SBR)

SBR (Nipol 1502, manufactured by Nihon Zeon Corp.) was put in a Banbury mixer at 120° C. and kneaded for 2 minutes. Then, 1 part by mass of the carboxynitrone synthesized as described above was added per 100 parts by mass of SBR and mixed at 150° C. for 6 minutes to modify the SBR with the carboxynitrone. The obtained carboxynitrone-modified SBR is referred to as "modified SBR."

The degree of modification was determined by $^1$H-NMR measurement (CDCl$_3$, 400 MHz, TMS) comparing the peak areas in the vicinity of 8.08 ppm (attributed to 2 protons adjacent to the carboxy group) before and after the modification of the SBRs. The degree of modification for the modified SBR 1 was 0.19 mol %.

Synthesis of Carboxynitrone-Modified BR (Modified BR)

Butadiene rubber (Nipol BR1220, manufactured by Nihon Zeon Corp.) was put in a Banbury mixer at 120° C. and kneaded for 2 minutes.

Then, 1 part by mass of the carboxynitrone synthesized as described above was added per 100 parts by mass of BR and mixed at 150° C. for 5 minutes to modify the BR with the carboxynitrone. The obtained carboxynitrone-modified BR is referred to as "modified BR."

The degree of modification was determined by $^1$H-NMR measurement (CDCl$_3$, 400 MHz, TMS) comparing the peak areas in the vicinity of 8.08 ppm (attributed to two protons adjacent to the carboxy group) before and after the modification of the BR. The degree of modification for the modified BR was 0.19 mol %.

Synthesis of Diphenylnitrone-Modified SBR (Comparative Modified SBR)

SBR was modified with diphenylnitrone according to the same method as for the modified SBR 1, except the diphenylnitrone synthesized as described above was used instead of carboxynitrone. The obtained diphenylnitrone-modified SBR is referred to as "comparative modified SBR."

The degree of modification was determined by $^1$H-NMR measurement (CDCl$_3$, 400 MHz, TMS) comparing the peak areas attributed to a phenyl group. The degree of modification for the comparative modified SBR was 0.21 mol %.

Comparative Examples 1 to 2 and Working Examples 1 to 4 Preparation of Rubber Composition for Coating a Fiber Cord The components shown in Table 1 below were blended in the proportions (part by mass) shown in Table 1 below.

Specifically, the components shown in Table 1 below except for sulfur and the vulcanization accelerator were first mixed in a Banbury mixer at a temperature of 80° C. for 5 minutes. Then, a roller was used to mix in the sulfur and the vulcanization accelerator to obtain each rubber composition for coating a fiber cord.

Note that Working Examples 1 to 3 correspond to the second aspect described above, and Working Example 4 corresponds to the first aspect described above.

Preparation of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent at a temperature of 60° C., tan δ (60° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency. The results are shown in Table 1 below (heat build-up).

The results were expressed as index values, with the tan δ (60° C.) of Comparative Example 1 defined as 100. Smaller values indicate superior low heat build-up.

Evaluation of Rigidity

The storage elastic modulus (E') was measured for the obtained vulcanized product in each example using a viscoelastic spectrometer (manufactured by Toyo Seiki Seisaku-sho, Ltd.) under the following conditions: 10% initial strain, ±2% amplitude, 20 Hz frequency, and 20° C. temperature. The results are shown in Table 1 below (rigidity).

The results were expressed as index values, with the storage elastic modulus (E') of Comparative Example 1 defined as 100. Larger values indicate a higher elastic modulus and better rigidity.

Evaluation of Adhesiveness

Rolled material to be used as a carcass member was manufactured, and two sheets of it were bonded and vulcanized. This was cut out into long rectangular pieces measuring 25 mm in width and 200 mm in length, thereby producing a sample.

On one end surface of the sample, cross cuts were made across the entire 25 mm width on the boundary face of the two sheets of rolled material, and the respective end portions in which the cuts were made were gripped on the top and bottom by a clamp of a tensile tester, and the two layers were gradually separated.

The rubber coating ratio was determined by the following formula from the area covered by the rubber remained on the fiber cord and the total area peeled on both faces of the separated surface. As the measured value, the average value of three samples was rounded off to one decimal place. Evaluation was performed from the calculated rubber coating ratio according to the following standards.

Rubber coating ratio (%)={(rubber area on cord)/ (total area of separated cord)}×100

5: Area in which fiber cord was exposed on coated surface was less than 1%

4: Area in which fiber cord was exposed on coated surface was not less than 1% and less than 5%

3: Area in which fiber cord was exposed on coated surface was not less than 5% and less than 10%

2: Area in which fiber cord was exposed on coated surface was not less than 10% and less than 20%

1: Area in which fiber cord was exposed on coated surface was not less than 20%

Note that the converted nitrone amounts in Table 1 below refer to the converted CPN amounts described above (Working Examples 1 to 3), parts by mass of carboxynitrone per 100 parts by mass of the total of the diene rubber and carboxynitrone (Working Example 4), and parts by mass of diphenylnitrone used for synthesis of the comparative modified SBR per 100 parts by mass of the diene rubber (Comparative Example 2).

The degree of modification in Table 1 below refers to the degree of modification described above. Note that, for examples using diphenylnitrone, the degree of modification refers to the proportion (mol %) of the double bonds modified by diphenylnitrone relative all the double bonds attributed to butadiene in the SBR.

TABLE 1

|  | Comparative Example 1 | Comparative Example 2 | Working Example 1 | Working Example 2 | Working Example 3 | Working Example 4 |
|---|---|---|---|---|---|---|
| Natural rubber | 50 | 50 | 50 | 50 | 50 | 50 |
| SBR | 35 | 5 | 5 | 35 | 20 | 34 |
| BR | 15 | 15 | 15 | — | — | 15 |
| Modified SBR | — | — | 30 | — | 15 | — |
| Modified BR | — | — | — | 15 | 15 | — |
| Comparative modified SBR | — | 30 | — | — | — | — |
| Carboxynitrone | — | — | — | — | — | 1 |
| Carbon black | 55 | 55 | 55 | 55 | 55 | 55 |
| Zinc oxide | 4 | 4 | 4 | 4 | 4 | 4 |
| Stearic acid | 1 | 1 | 1 | 1 | 1 | 1 |
| Tackifier | 2 | 2 | 2 | 2 | 2 | 2 |
| Anti-aging agent | 1 | 1 | 1 | 1 | 1 | 1 |
| Process oil | 5 | 5 | 5 | 5 | 5 | 5 |
| Vulcanization accelerator | 1 | 1 | 1 | 1 | 1 | 1 |
| Sulfur | 2.5 | 2.5 | 2.5 | 2.5 | 2.5 | 2.5 |
| Converted nitrone amount (Parts by mass) | — | 0.30 | 0.15 | 0.30 | 1.00 | |
| Modification conditions | — | 150° C. 6 min | 150° C. 6 min | 150° C. 6 min | 150° C. 6 min | — |

TABLE 1-continued

|  | Comparative Example 1 | Comparative Example 2 | Working Example 1 | Working Example 2 | Working Example 3 | Working Example 4 |
| --- | --- | --- | --- | --- | --- | --- |
| Degree of modification (mol %) | — | 0.21 | 0.19 | 0.19 | 0.43 | — |
| Heat build-up | 100 | 102 | 92 | 92 | 88 | 97 |
| Rigidity | 100 | 97 | 108 | 103 | 109 | 103 |
| Adhesiveness | 3 | 3 | 4 | 4 | 4 | 4 |

The details of each component shown in Table 1 above are as follows.

Natural rubber: TSR20

SBR: Nipol 1502 (styrene unit content: 23.5 mass %, Mw: 450,000, manufactured by Nihon Zeon Corp.)

BR: Nipol BR1220 (manufactured by Nihon Zeon Corp.)

Modified SBR: modified SBR synthesized as described above

Modified BR: modified BR synthesized as described above

Comparative modified SBR: comparative modified SBR synthesized as described above Carboxynitrone: carboxynitrone synthesized as described above Carbon black: GPF grade carbon black (DIABLACK G, nitrogen adsorption specific surface area: 29 $m^2/g$, manufactured by Mitsubishi Chemical Corporation)

Zinc oxide: Zinc White No. 3 (Seido Chemical Industry Co., Ltd.)

Stearic acid: Stearic acid YR (manufactured by NOF Corporation)

Tackifier: Para octyl phenolic resin, Hitanol (1502Z)

Anti-aging agent: SANTOFLEX 6PPD (manufactured by Soltia Europe)

Process oil: Extract No. 4 S (manufactured by Showa Shell Seikyu K.K.)

Vulcanization accelerator 1: Nocceler CZ-G (manufactured by Ouchi Shinko Chemical Industrial Co., Ltd.)

Sulfur: oil treatment sulfur (manufactured by Karuizawa Refinery Ltd.)

As is evident from Table 1 above, Working Example 4 (which included carboxynitrone) and Working Examples 1 to 3 (which included carboxynitrone-modified rubber) exhibited superior low heat build-up and better adhesiveness to the carcass cord as well as higher rigidity than Comparative Example 1 (which included neither carboxynitrone nor carboxynitrone-modified rubber). On the other hand, it was found that Comparative Example 2 (which included comparative modified SBR modified with diphenylnitrone) had an effect inferior to that of Comparative Example 1.

REFERENCE SIGNS LIST

1 Bead portion
2 Sidewall portion
3 Tire tread portion
4 Carcass cord
5 Bead core
6 Bead filler
7 Belt layer
8 Rim cushion

The invention claimed is:

1. A rubber composition for coating a fiber cord comprising a diene rubber and a carbon black;
    the diene rubber comprising a natural rubber and a modified rubber, the modified rubber being obtained by reacting a nitrone compound having a carboxy group with a double bond of a styrene-butadiene rubber and/or a butadiene rubber;
    a content of the natural rubber in the diene rubber being not greater than 65 mass %;
    a content of the carbon black being from 40 to 67 parts by mass per 100 parts by mass of the diene rubber; and
    a content of the nitrone compound used for synthesis of the modified rubber being from 0.1 to 10 parts by mass per 100 parts by mass of the diene rubber.

2. The rubber composition for coating a fiber cord according to claim 1, wherein a content of the styrene-butadiene rubber and the butadiene rubber used for synthesizing the modified rubber is from 10 to 60 mass % in the diene rubber.

3. The rubber composition for coating a fiber cord according to claim 1, wherein the nitrone compound is a compound selected from the group consisting of N-phenyl -α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

4. The rubber composition for coating a fiber cord according to claim 2, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

5. The rubber composition for coating a fiber cord according to claim 1, wherein a nitrogen adsorption specific surface area of the carbon black is from 20 to 60 $m^2/g$.

6. The rubber composition for coating a fiber cord according to claim 2, wherein a nitrogen adsorption specific surface area of the carbon black is from 20 to 60 $m^2/g$.

7. The rubber composition for coating a fiber cord according to claim 3, wherein a nitrogen adsorption specific surface area of the carbon black is from 20 to 60 $m^2/g$.

8. The rubber composition for coating a fiber cord according to claim 4, wherein a nitrogen adsorption specific surface area of the carbon black is from 20 to 60 $m^2/g$.

9. A pneumatic tire comprising a carcass cord coated using the rubber composition for coating a fiber cord described in claim 1.

10. A pneumatic tire comprising a carcass cord coated using the rubber composition for coating a fiber cord described in claim 2.

* * * * *